(12) United States Patent
Corey et al.

(10) Patent No.: US 10,848,942 B1
(45) Date of Patent: Nov. 24, 2020

(54) VALIDATING OVER-THE-AIR CONFIGURATION COMMANDS

(71) Applicant: T-Mobile USA, Inc., Bellevue, WA (US)

(72) Inventors: Shawn David Corey, Kenmore, WA (US); Michael Cleat Bishop, II, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/737,729

(22) Filed: Jan. 8, 2020

(51) Int. Cl.
*H04W 4/50* (2018.01)
*H04W 4/14* (2009.01)
*H04L 9/06* (2006.01)
*H04W 8/24* (2009.01)
*H04W 48/18* (2009.01)
*H04L 29/08* (2006.01)

(52) U.S. Cl.
CPC ............ *H04W 4/50* (2018.02); *H04L 9/0637* (2013.01); *H04L 69/329* (2013.01); *H04W 4/14* (2013.01); *H04W 8/245* (2013.01); *H04W 48/18* (2013.01); *H04L 2209/38* (2013.01)

(58) Field of Classification Search
CPC ....................................................... H04W 4/50

USPC ......................................................... 455/419
See application file for complete search history.

(56) References Cited

U.S. PATENT DOCUMENTS

2019/0289454 A1* 9/2019 Inoue ............... H04W 12/04071

* cited by examiner

*Primary Examiner* — Joel Ajayi
(74) *Attorney, Agent, or Firm* — Lee & Hayes, P.C.

(57) ABSTRACT

In a wireless communication network such as a cellular network, cellular devices may receive over-the-air (OTA) configuration commands that specify requested device configuration settings. For example, an OTA configuration command may be a binary short message service (SMS) message specifying a configuration parameter and a requested value of the configuration parameter. Upon receiving an OTA configuration command, the cellular device refers to a blockchain that specifies permissible values for various configuration parameters. If a requested configuration parameter value is not indicated by the blockchain to be permissible, the cellular device disregards the OTA configuration command and refuses to implement the requested setting. The cellular device may periodically retrieve updates to the blockchain and may attempt to validate any updated blocks, based on previously validated blocks. If the updates cannot be validated, the cellular device may decline to implement any requested configuration settings.

19 Claims, 3 Drawing Sheets

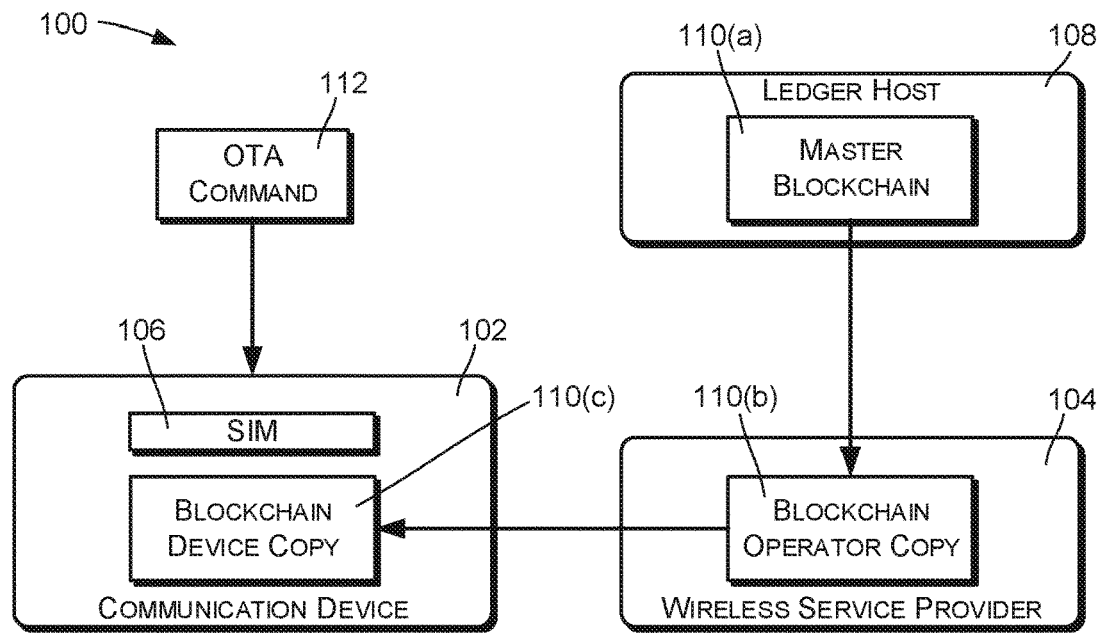
FIG. 1
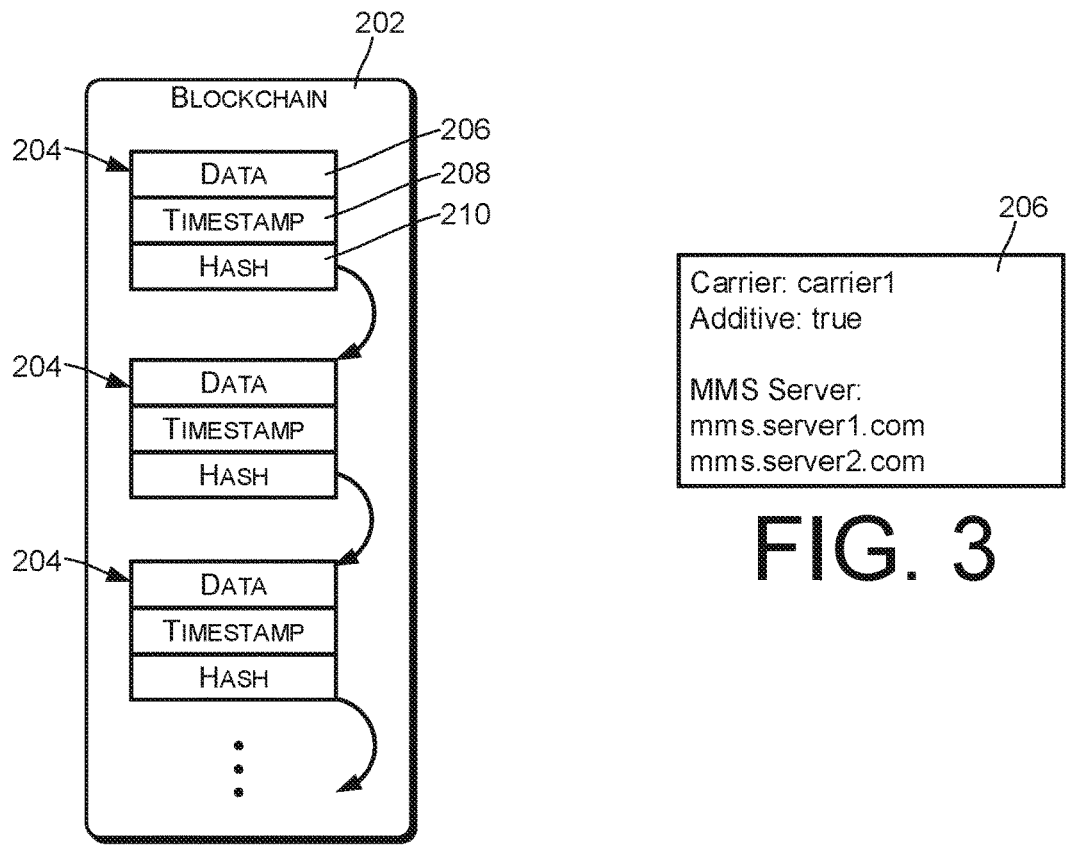
FIG. 2
FIG. 3

VALIDATING OVER-THE-AIR CONFIGURATION COMMANDS

BACKGROUND

OTA (over-the-air) provisioning allows cellular network operators to configure mobile devices during and after device provisioning. Open Mobile Alliance-Client Provisioning (OMA-CP) and Open Mobile Alliance-Device Management (OMA-DM) are examples of protocols that are often used for OTA provisioning. When using these protocols, requested settings are embedded in an Extensible Markup Language (XML) data object and sent to a mobile device over the wireless network as a binary Short Message Service (SMS) message.

OMA-CP and OMA-DM configuration commands allow a wireless network provider to specify and alter device configuration settings relating to MMS messaging servers, proxy servers, browser homepage and bookmarks, mail servers, and directory servers for synchronizing contacts and calendar information.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a block diagram illustrating high-level components of a system in which blockchain information is used to validate over-the-air (OTA) configuration commands.

FIG. 2 is a block diagram illustrating an example blockchain that may be used for storing permission information relating to OTA configuration commands.

FIG. 3 shows an example of permission information that may be specified by a block of the example blockchain shown in FIG. 2.

DETAILED DESCRIPTION

Figure 4:
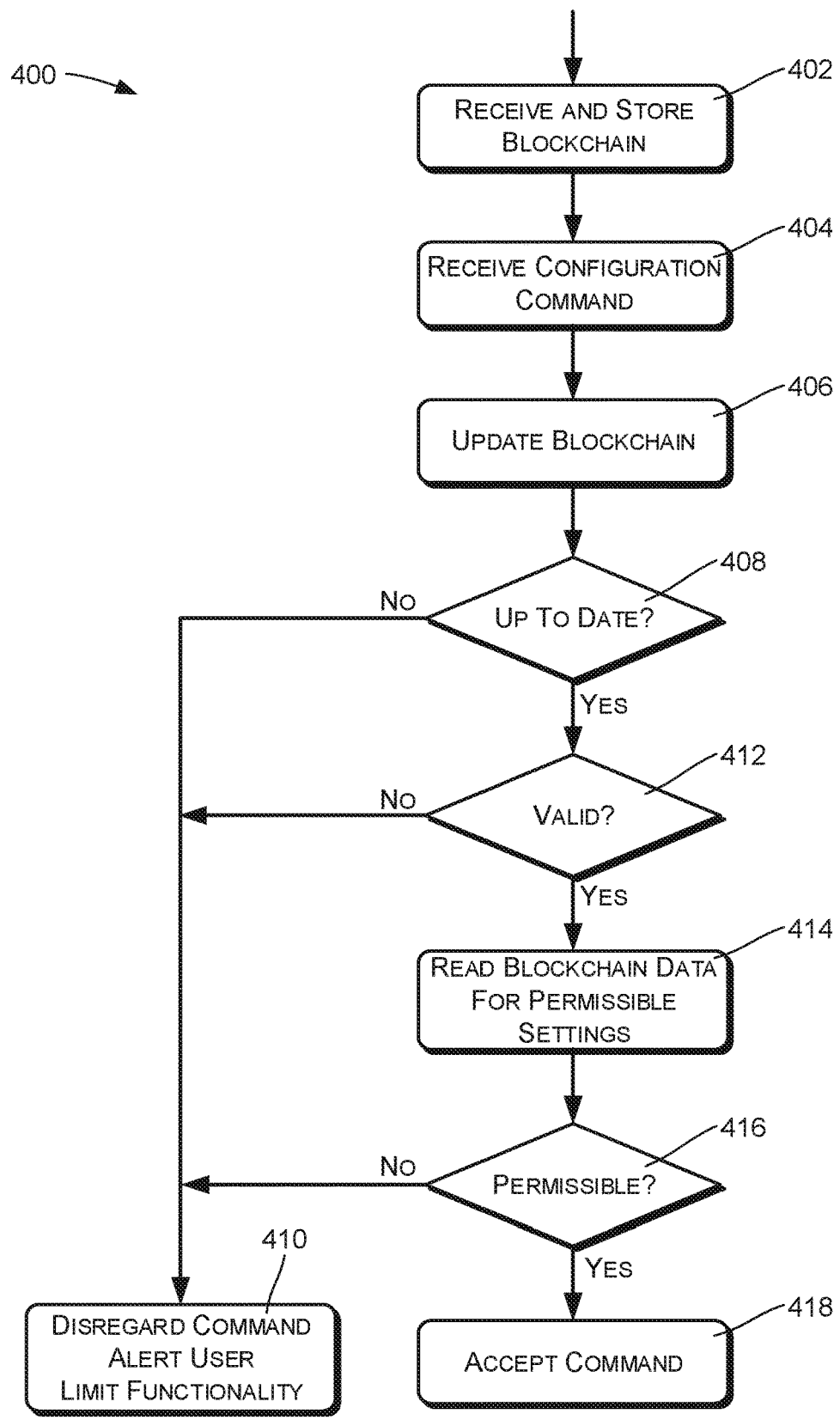
FIG. 4 is a flow diagram illustrating an example method of protecting a cellular device from malicious or unauthorized OTA configuration commands.

This disclosure describes, in part, techniques for protecting a mobile device against unauthorized and/or malicious over-the-air (OTA) configuration commands. Open Mobile Alliance-Client Provisioning (OMA-CP) and Open Mobile Alliance-Device Management (OMA-DM) are examples of OTA protocols that are commonly used to provide configuration settings to mobile devices. Commands in accordance with these protocols specify settings for various configuration parameters. For example, settings that might be specified by an OTA configuration command include identifications of MMS messaging servers, proxy addresses, browser homepage and bookmarks, mail servers, and directory servers for synchronizing contacts and calendar information.

In a described embodiment, a centrally managed ledger is implemented as a blockchain that contains permissibility information regarding certain settings that might be the subject of OTA configuration commands. For example, the blockchain may specify permissible and/or impermissible values of a given device setting. From time to time, blocks may be added to the blockchain to specify additional or different permissible setting values.

The blocks of the blockchain are organized as a linked chain, where each block includes a cryptographic hash of the previous block. To verify that the blockchain has not been modified, a hash is recomputed for each block and the recomputed hash is compared for equivalence with the hash actually specified by the blockchain. The blockchain is considered to be valid if the hashes of all blocks can be verified in this manner.

The blockchain may be stored by a communication device and used by the communication device to verify the permissibility of any settings specified by an OTA configuration command. Upon receiving an OTA configuration command, the mobile device ensures that it has an up-to-date copy of the blockchain, which may involve obtaining a new copy of the blockchain or obtaining updated blocks of the blockchain. The communication device then validates the blockchain to ensure that it has not been modified. If an up-to-date copy of the blockchain cannot be obtained and/or the blockchain cannot be validated, any received OTA configuration commands are disregarded.

Upon determining that its copy of the blockchain is up to date and valid, the communication device reads the blocks of the blockchain to obtain a list of permissible configuration settings. The list may include permissible values for each of multiple configuration parameters that may be the subject of OTA configuration commands. If a parameter value specified by an OTA configuration command is not among the permissible values specified by the blockchain, the OTA configuration command is disregarded.

Permissibility information may be specified and organized within the blockchain in different ways. In some cases, each block may include a comprehensive specification for all settings that might be the subject of OTA provisioning commands, and these settings are understood to supersede the settings specified by earlier blocks. In other cases, each block may specify permissible values for a single configuration parameter and may specify whether the values supersede or augment previously specified values for the parameter.

The blockchain ledger may be managed by a standards organization or other central entity on behalf of multiple wireless network providers. This entity may provide a network-based service through which the wireless network providers may submit new permissibility information. Upon receiving new permissibility information, the entity creates and adds one or more blocks to the blockchain to specify the new information. A mobile device may be configured to consider only those settings that are specified by the wireless network provider associated with the SIM of the mobile device.

A mobile device is initially provisioned with the most recent version of the blockchain or at least an initial portion of the blockchain. Subsequently, the device may obtain updates to the blockchain either by receiving new copies of the entire blockchain or by receiving blocks that have been added after the blocks already known to the mobile device. Updates may be provided by extensions of services provided by the wireless network provider associated with the mobile device. Alternatively, updates may be obtained by HTTP requests to host servers, such as may be provided by the central entity described above. In some cases, blockchain updates may be provided as part of operating system updates initiated by the wireless network provider associated with the mobile device.

The described techniques can be used to protect against attacks that might otherwise be attempted by sending unauthorized OTA configuration commands, such as unauthorized OMA-CP and OMA-DM commands. By making the blockchain public, the techniques can also provide transparency to the operations and practices of individual network providers. In some cases, public alerts may be issued, advising users not to use certain cell phone networks.

FIG. 1 illustrates high-level components of a system 100 that may be used to implement the described techniques. The system 100 comprises a wireless communication device 102 and a wireless service provider 104. The communication device may comprise a smartphone or other handset, for example. The communication device 102 may also comprise an Internet-of-Things (IoT) device, such as a home controller, security camera, industrial controller, etc. The communication device 102 is associated with the wireless service provider 104 by a Subscriber Identity Module (SIM) 106. The SIM 106 is typically a physical component that is inserted into the communication device.

A ledger host 108 stores and maintains a configuration validation ledger in the form of a master blockchain 110(a). Copies of the master blockchain 110(a) or portions of the master blockchain 110(a) that are held by various entities and devices will be referred to generally as the blockchain 110.

The master blockchain 110(a) comprises multiple data blocks that are cryptographically linked in the chronological order of their addition to the master blockchain 110(a). The blocks of the master blockchain 110(a) contain data relating to the permissibility of various settings and configuration values that might be specified by OTA configuration commands.

The ledger host 108 may in some embodiments comprise a central coordinating entity or authority that maintains the blockchain on behalf of multiple wireless service providers. For example, a standards organization might be responsible for maintaining the master blockchain 110(a). Such an organization might, for example, provide a web-based service and/or application programming interface (API) for access by various wireless service providers to submit and update permission information. More specifically, the ledger host 108 may receive specifications of provider-specific permission values for the blockchain from multiple service providers. Upon receiving new or updated permission information, the ledger host 108 adds blocks to the master blockchain 110(a) to specify the new or updated permission information.

Alternatively, the wireless service provider 104 itself may be the ledger host and the blockchain 110 might be have permissions permission information relating to that wireless service provider 104.

In the embodiment of FIG. 1, the wireless service provider 104 communicates with the ledger host 108 to obtain a copy of the master blockchain 110(a). The blockchain copy as held by the wireless service provider 104 will be referred to herein as the blockchain operator copy 110(b). The communication device 102 similarly communicates with the wireless service provider 104 to obtain a copy of the blockchain operator copy 110(b). The blockchain copy as held by the device 102 will be referred to herein as the blockchain device copy 110(c).

The blockchain provider copy 110(b) may at times comprise only a portion of the master blockchain 110(a), such as when the master blockchain 110(a) has been updated and the updates have not propagated to the blockchain operator copy 110(b). Similarly, the blockchain device copy 110(c) may in some cases comprise only a portion of the blockchain operator copy 110(b). For example, the communication device 102 may not always have the most recently added blocks of the master blockchain 110(a).

Furthermore, the blockchain operator copy 110(b) and the blockchain device copy 110(c) may not always include a leading portion of the master blockchain 110(a). For example, this may be true in situations where the information specified by such a leading portion has been superseded by later blocks of the blockchain. The term "leading portion" is used herein to indicate a contiguous sequence of blocks beginning with the root block of the blockchain.

Communications between the wireless service provider 104 and the ledger host 108 may be via various forms of network communications, which may include private networks as well as public networks such as the Internet. The ledger host 108 may expose various application programming interfaces (APIs) that can be used by the wireless service provider 104, with appropriate authentication, to obtain the blockchain operator copy 110(b).

Communications between the wireless service provider 104 and the device 102 may be through wireless communication channels, which may utilize various technologies including cellular networking and Wi-Fi. The device 102 may communicate directly with the wireless service provider 104 through the infrastructure of the wireless service provider 104, using network services such as Long-Term Evolution (LTE) and $5^{th}$-Generation (5G). Alternatively, the device 102 may communicate through any available public or private communication networks, including the Internet.

FIG. 1 shows an OTA configuration command 112 being received by the communication device 102. The OTA configuration command 112 in some cases might comprise a binary SMS (Short Messaging Service) message containing XML (eXtensible Markup Language) data. In normal and expected usage, the OTA command originates with the wireless service provider 104 or with another wireless service provider. However, the OTA configuration command 112 may conceivably be sent by any entity capable of sending SMS messages. In described embodiments, the OTA configuration command 112 may comprise an Open Mobile Alliance-Client Provisioning (OMA-CP) command or an Open Mobile Alliance-Device Management (OMA-DM) command.

FIG. 2 illustrates details of an example blockchain 202. The master blockchain 110 (a) may have the structure shown in FIG. 2. The blockchain operator copy 110(b) and the blockchain device copy 110(c) may also have this structure.

The blockchain 202 comprises multiple blocks 204. Each block 204 comprises a data object 206 containing data relating to the permissibility of OTA configuration commands. Each block 204 may also include a timestamp 208, indicating the time that the block was created and added to the blockchain 202.

Blocks 204 may be added to the blockchain 202 over time, in a chronological sequence. Each sequentially added block 204 may specify a corresponding data object 206 and timestamp 208. In addition, each block 204 has a hash value 210, which is generated from and links to the previous block 204 in the blockchain 202. FIG. 2 shows multiple blocks 204 in the chronological sequence of their creation from bottom to top. The upper-most block 204 of the blockchain 202 is the most recently added block. The initial, bottom-most block 204, which is not shown in FIG. 2, is referred to as the root block.

FIG. 3 shows an example data object 206 containing permissibility information. In an example environment, each of the data objects 206 specifies one or more allowed settings. In the context of OMA-CP commands, specified permissible settings may be for MMS messaging servers, proxy servers, browser homepages and bookmarks, email servers, and directory servers for synchronizing contacts and calendar information.

In the illustrated example, the data object 206 specifies a configuration parameter and corresponding parameter values. The parameter values may be those that are permissible for the specified configuration parameter. In FIG. 3, for example, the data object 206 specifies two possible MMS servers as being permissible values for the "MMS Server" configuration parameter: "mms.server1.com" and "mms.server2.com".

Collectively, the data objects 206 of the data blocks 204 may specify provider-specific permissible values for each of multiple wireless service providers. Each data object 206 may identify a particular wireless network provider to which its specified settings are relevant. In the example of FIG. 3, the data object 206 specifies "carrier1" as an identification of a particular wireless network provider for which the specified settings are applicable.

In some cases, the data object 206 may also have a parameter indicating whether the settings specified by the data object 206 are additive to settings specified by earlier blocks of the blockchain 110 or supersede setting specified by earlier blocks. In the example data object 206, a property "Additive" is specified as being "true", indicating that the specified MMS servers are to be considered as additions to previously specified of permissible servers for carrier1. A "false" value for the "Additive" value would indicate that the MMS server specifications supersede and replace any previous specifications of MMS servers for carrier1.

The data object 206 includes permissible values for a single configuration parameter (i.e., "MMS Server") and for a single wireless network provider (i.e., "carrier1"). However, a single block may in some cases specify permissible values for multiple configuration parameters and for multiple wireless network providers.

Generally, permissibility information for multiple different settings and multiple different wireless service providers may be distributed among blocks in various ways. For example, each block might include a comprehensive specification of all possible settings, to supersede the specifications of all previous blocks. Alternatively, each block may relate to a single configuration parameter or to a subset of configuration parameters that are available for use in configuration commands. Furthermore, an individual block may specify permissible values, for a particular configuration parameter, that are to be treated as being additive to previously specified permissible values for the same configuration parameter. The permissibility information may also specify revocation of previously permissible values.

Although FIG. 3 shows permissibility information in a readable form, in practice the information may be specified within an Extensible Markup Language (XML) data structure. Specifically, the data object 206 may comprise XML data specifying configuration parameters and corresponding values. For each parameter, the corresponding values may be those that are permissible for the parameter. Additionally, for each parameter, the XML data may indicate whether the specified parameter values are to be added to previously specified parameter values for the parameter or are to supersede previously specified parameter values. Various flags and other metadata may be specified to indicate how the specified parameter values are to be used.

It will be apparent that permissibility information may be specified in many different ways with varying levels of specificity, and that XML structures may be formatted to accommodate various types of information. For example, XML data may indicate, for each provided value, whether it is a permissible value or an impermissible value. As another example, permissible and/or impermissible values may be represented as ranges or by using wildcard characters. XML data structures may group permissibility information by wireless service provider, allowing devices from different providers to operate with different settings.

FIG. 4 illustrates an example process 400 that may be performed by a cellular communication device (referred to at times below as a device) to determine whether to accept or disregard any received configuration command.

An action 402 comprises receiving at least an initial portion of a blockchain and storing the portion of the blockchain in memory of the device, wherein the blockchain specifies permissibility information as discussed above. In an example embodiment, the permissibility information comprises one or more permissible values for each of multiple configuration parameters. In some cases, the permissibility information may alternatively, or additional, include one or more impermissible values for each of the multiple configuration parameters. More generally, the permissibility information may include data, in any desired format, from which permissible and/or impermissible configuration settings can be determined.

The action 402 may be performed during initial provisioning of the device, as an example, such as when the device initially connects to a cellular network. In some embodiments, the blockchain may be maintained and updated by a central entity, periodically updated or retrieved by a wireless service provider, and sent to the cellular device by the wireless service provider during or in conjunction with provisioning of the device, such as when the device first connects to a wireless network.

In some implementations, the action 402 may comprise receiving and storing the entire current blockchain. In other implementations, the action 402 may comprising receiving and storing an initial portion of the blockchain. In some implementations, the action 402 may comprise receiving and storing only the root block of the blockchain. In cases where earlier blocks of the blockchain have become irrelevant because of being superseded by later blocks, the action 402 may comprise receiving only a later portion that omits earlier, irrelevant blocks.

An action 404, performed during normal consumer use of the device subsequent to provisioning, comprises receiving an over-the-air (OTA) configuration command over a wireless communication network such as a cellular communication network. In some cases, the OTA configuration command may be a binary short message service (SMS) message. For example, the OTA configuration command may comprise an Open Mobile Alliance-Client Provisioning (OMA-CP) command or an Open Mobile Alliance-Device Management (OMA-DM) command, in which configuration data is specified using the Extensible Markup Language (XML) format.

The OTA configuration command may specify one or more configuration settings that the device is expected to implement. More specifically, the command may specify a configuration parameter and a requested value for the configuration parameter. The device is expected to respond to the configuration command by implementing the requested setting. That is, the device is expected to set the specified configuration parameter to the requested parameter value. In some cases, a single command may specify a requested value for each of multiple configuration parameters. OMA-CP commands, for example, can specify MMS messaging servers, proxy servers, browser homepage and bookmarks, mail servers, and directory servers for synchronizing contacts and calendar information.

An action 406, which may be performed in response to receiving the OTA configuration command, comprises updating the blockchain, or blockchain portion, that has been previously stored by the device. The action 406 may comprise communicating with the wireless network provider associated with the device's SIM and receiving either a current copy of the blockchain or an updated portion of the blockchain, where the updated portion comprises any blocks that have been added to the blockchain but not yet been obtained by the device. In some cases, updates may be provided by extensions of services provided by the wireless network provider associated with the cellular device. Alternatively, updates may be obtained by HTTP requests to host servers, such as may be provided by the central entity described above. In some cases, blockchain updates may be provided as part of operating system updates initiated by the wireless network provider associated with the cellular device.

Rather than being performed in response to receiving the OTA configuration command, the action 406 may in some embodiments be performed periodically in order to maintain an up-to-date copy of the blockchain.

An action 408 comprises determining whether the cellular device has an up-to-date copy of the blockchain. In some cases, for example, the action 406 may have been unsuccessful, and the cellular device has not been able to retrieve or update the blockchain for some period of time. Determining whether the blockchain held by the cellular device is up to date may be determined by referencing the timestamp of the most recent block of the blockchain. The blockchain may be considered to be up to date if the time indicated by the timestamp of the most recent block is within a predetermined time of the current time.

More specifically, the action 408 may comprise determining an age of the most recent blockchain block that has been obtained by the device, based at least in part on the timestamp of the most recent block and determining whether the age exceeds a threshold. For example, the blockchain may be considered to be up to date if the time of the most recent block is no more than a week earlier than the current time. If the cellular device does not have an up-to-date copy of the blockchain, an action 410 is performed of disregarding the received configuration command and declining to implement the requested configuration setting.

An action 412 comprises verifying the integrity of the blockchain or any portion of the blockchain that the device has not yet validated. This is referred to as validation. In general, validating updated portions of the blockchain, such as any portion received in the action 406, may be based on initial or earlier portions of the blockchain that have already been validated. Validation is ultimately based on the leading or initial portion of the blockchain provided to the device during provisioning. Validation may comprise recalculating the hashes of the blocks and verifying that they are the same as the corresponding hashes specified by the blocks. Once any initial or earlier portion of the blocks has been validated, it is not necessary to repeat the validation for that portion, and validation may continue with subsequent blocks of the blockchain.

If in the action 412 it is determined that the blockchain is not valid, the action 410 is performed of disregarding the received configuration command and declining to implement the requested configuration setting.

If in the action 412 it is determined that the blockchain is valid, an action 414 is performed of reading the blockchain data to compile a list of configuration parameters and their allowed values. The details of the action 414 will vary depending on the format of the blockchain data. In some cases, the action 414 may comprise reading the data block of the most recent block of the blockchain. In other cases, the action 414 may include reading data from all or many of the blocks of the blockchain to gather information regarding whether any particular requested settings are permissible for the wireless network provider associated with the cellular device (i.e., the provider that issued the SIM being used by the device).

After compiling the list of permissible settings, an action 416 is performed of determining whether a setting specified by the received OTA configuration command is permissible. This is performed by comparing the specified setting to the permissible settings determined in the action 414. More specifically, the action 416 may comprise determining whether a value that has been requested for a particular configuration parameter is among the permissible values that are specified by the blockchain for that configuration parameter and for the provider with which the device is associated.

If the requested setting is not permissible, the action 410 is performed of disregarding the received configuration command and declining to implement the requested configuration setting. If the requested setting is permissible, an action 418 is performed of accepting the configuration command and implementing the requested setting by setting the specified configuration parameter to the requested value.

In some cases, the action 410 may include alerting a user of the cellular device, interacting with the user in some other way, or taking some additional action. For example, the action 410 may include simply alerting the user that a configuration command has been received and disregarded. As another example, the action 410 may comprise alerting the user that an impermissible setting has been requested and asking the user whether or not to accept the requested setting. As another example, the device may provide an alert suggesting that the user activate Wi-Fi to allow retrieval of an updated blockchain. As another example, the action 410 may comprise limiting the functionality of the cellular device to prevent possibly malicious activities. For example, data communications of the cellular device may be disabled. Again, this may be contingent upon user approval.

Figure 5:
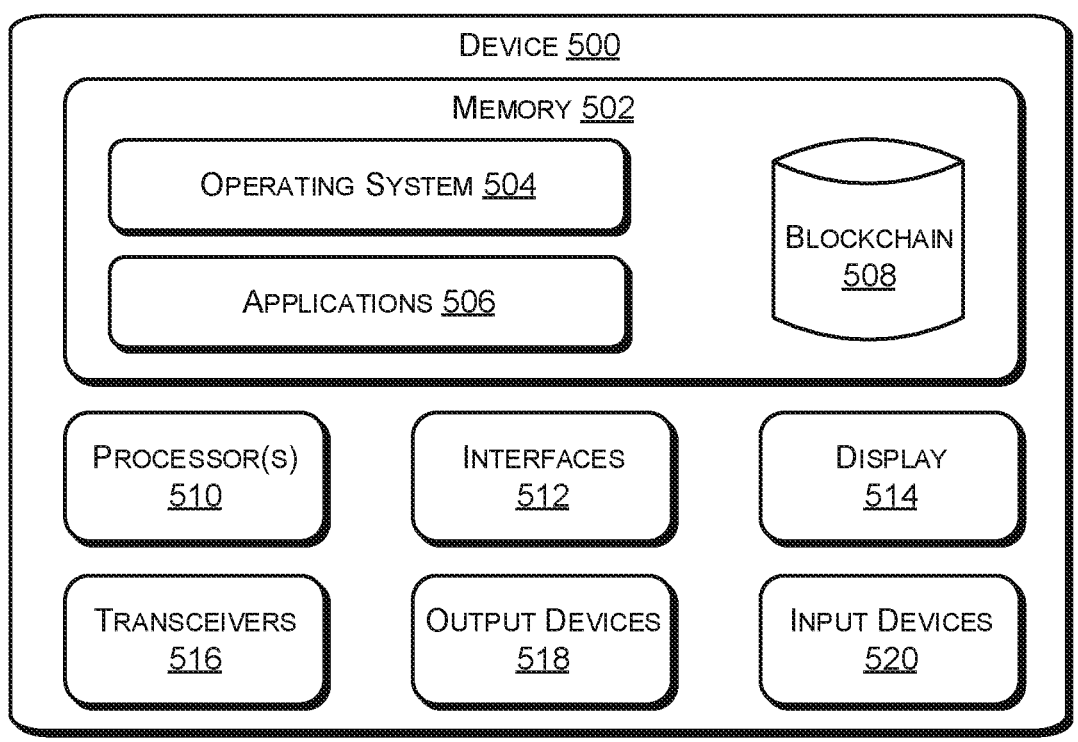
FIG. 5 is a block diagram of an example computing device that may be configured in accordance with the described techniques.

FIG. 5 illustrates an example cellular communication device 500 that may be used to implement the techniques described herein. The method of FIG. 4, for example, may be implemented by a device such as the device 500. The device 500 is an example of the communication device 102, illustrating additional high-level components that are not shown in FIG. 1.

The device 500 may include memory 502, which may store an operating system 504 as well as various applications 506 and associated data. A blockchain 508, such as the blockchain device copy 110(c) discussed above, may be stored in the memory 502.

The device 500 has one or more processors 510 for executing the operating system 504 and the applications 506. Each processor may comprise a central processing unit (CPU), a graphics processing unit (GPU), or other processing unit or component known in the art. The memory 502 stores one or more sets of computer-executable instructions (e.g., software) such as programs that embody operating logic for implementing and/or performing desired functionality of the device 500, including the functionality described above relating to OTA configuration commands and blockchain operations. Supporting or associated data is also stored by the memory 502. The instructions may also reside at least partially within the processor 510 during execution thereof by the device 500. The instructions may include instructions for implementing the process 400 of FIG. 4, including validating and reading blockchains. In some cases, logic for implementing the process 400 of FIG. 4 may be implemented by the operating system 504 and/or by one of the applications 506.

In various embodiments, the memory 502 may include both volatile memory and non-volatile memory. The memory 502 can also be described as non-transitory computer storage media/memory, machine-readable media/memory, or computer-readable media/memory, and may include removable and non-removable media implemented in any method or technology for storage of information, such as computer readable instructions, data structures, program modules, or other data. Additionally, in some embodiments the memory 502 may include a SIM (subscriber identity module), which is a removable smart card used to identify a user of the device 500 to a service provider network.

The memory 502 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 502 may in some cases include storage media used to transfer or distribute instructions, applications, and/or data. In some cases, the memory 502 may include data storage that is accessed remotely, such as network-attached storage that the device 500 accesses over some type of data communication network.

The device 500 may have interfaces 512, which may comprise any sort of interfaces known in the art. The interfaces 512 may include any one or more of an Ethernet interface, wireless local-area network (WLAN) interface, a Bluetooth® interface, a near field interface, a DECT chipset, or an interface for an RJ-11 or RJ-45 port. A wireless LAN interface can include a Wi-Fi interface or a Wi-Max interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 500 may have a display 514, which may comprise a liquid crystal display (LCD) or any other type of display commonly used in telemobile devices or other portable devices. For example, the display 514 may be a touch-sensitive display screen, which may also act as an input device or keypad, such as for providing a soft-key keyboard, navigation buttons, or the like.

The communication device 500 may also include one or more transceivers 516, which may include any sort of transceivers known in the art. For example, the transceivers 516 may include radios and/or radio transceivers and interfaces that perform the function of transmitting and receiving radio frequency communications via an antenna, through a cellular communication network of a cellular communications carrier. The radio interfaces facilitate wireless connectivity between the device 500 and various cell towers, base stations and/or access points.

The device 500 may have output devices 518 and input devices 520. The output devices 518 may include any sort of output devices known in the art, such as speakers, a vibrating mechanism, or a tactile feedback mechanism. The output devices 518 may also include ports for one or more peripheral devices, such as headphones, peripheral speakers, or a peripheral display. The input devices 520 may include any sort of input devices known in the art. For example, the input devices 520 may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method performed by a cellular communication device, the method comprising:
   during device provisioning, storing at least an initial portion of a blockchain in a memory of the cellular communication device, wherein the blockchain specifies permissible values of a configuration parameter;
   subsequent to the device provisioning, receiving a first over-the-air (OTA) configuration command over a wireless communication network, wherein the first OTA configuration command specifies a first requested value of the configuration parameter;
   in response to receiving the first OTA configuration command, receiving at least an updated portion of the blockchain over the wireless communication network;
   verifying, using a processor of the cellular communication device, integrity of at least the updated portion of the blockchain based at least in part on the initial portion of the blockchain stored during device provisioning;
   determining whether the first requested value of the configuration parameter is among the permissible values of the configuration parameter specified by the blockchain; and
   in response to determining that the first requested value of the configuration parameter is among the permissible values of the configuration parameter specified by the blockchain and based at least in part on verifying the integrity of at least the updated portion of the blockchain, setting the configuration parameter to the first requested value specified by the first OTA configuration command.

2. The method of claim 1, wherein the first OTA provisioning command comprises an Open Mobile Alliance Client Provisioning (OMA-CP) binary Short Message Service (SMS) message.

3. The method of claim 1, further comprising:
   receiving a second OTA configuration command, wherein the second OTA configuration command specifies a second requested value of the configuration parameter;
   determining whether the second requested value of the configuration parameter is among the permissible values of the configuration parameter specified by the blockchain; and in response to determining that the second requested value of the configuration parameter is not among the permissible values of the configuration parameter specified by the blockchain, declining to set the configuration parameter to the second requested value.

4. The method of claim 1, wherein:
the blockchain comprises a sequence of data blocks; and
later data blocks of the sequence specify updates to permissible configuration values specified by earlier data blocks of the sequence.

5. The method of claim 1, wherein the blockchain specifies provider-specific permissible values for each of multiple wireless service providers.

6. The method of claim 1, wherein:
the blockchain is maintained by an entity on behalf of multiple wireless service providers; and
the entity receives provider-specific permission values for the blockchain from the multiple wireless service providers.

7. A method performed by a cellular communication device, the method comprising:
receiving a blockchain having one or more blocks that contain permissibility information regarding one or more device settings, the receiving the blockchain comprising:
receiving an initial portion of the blockchain in conjunction with device provisioning;
storing the blockchain in a memory of the cellular communication device;
subsequent to device provisioning, receiving an updated portion of the blockchain; and
verifying, using a processor of the cellular communication device, integrity of at least the updated portion of the blockchain based at least in part on the initial portion of the blockchain stored during device provisioning;
receiving a first configuration command, wherein the first configuration command specifies a first configuration setting, the first configuration command being an OTA configuration command;
determining whether the first configuration setting is permissible based at least in part on the permissibility information contained in the one or more blocks of the block chain; and
in response to verifying the integrity of at least the updated portion of the blockchain and determining that the first configuration setting is not permissible, declining to implement the first configuration setting.

8. The method of claim 7, further comprising:
receiving a second configuration message, wherein the second configuration command specifies a second configuration setting;
determining whether second configuration setting is permissible based at least in part on the permissibility information; and
in response to determining that the second configuration setting is permissible, implementing the second configuration setting.

9. The method of claim 7, wherein a most recent block of the one or more blocks specifies a timestamp, the method further comprising:
determining an age of the most recent block of the one or more blocks based at least in part on the timestamp;
determining that the age exceeds a threshold; and
in response to determining that the age exceeds the threshold, declining to implement the first configuration setting.

10. The method of claim 7, wherein the updated portion of the blockchain is received in response to receiving the first configuration command.

11. The method of claim 7, wherein the first configuration command comprises an Open Mobile Alliance Client Provisioning (OMA-CP) binary Short Message Service (SMS) message.

12. The method of claim 7, wherein the permissibility information comprises one or more permissible values for a designated configuration parameter.

13. The method of claim 7, wherein the permissibility information comprises one or more impermissible values for a designated configuration parameter.

14. The method of claim 7, wherein later blocks of the blockchain specify permissibility information that supersedes permissibility information of earlier blocks of the blockchain.

15. The method of claim 7, wherein later blocks of the blockchain specify permissibility information that augments permissibility information of earlier blocks of the blockchain.

16. The method of claim 7, wherein:
the blockchain is maintained by an entity on behalf of multiple wireless service providers; and
the entity receives provider-specific permission values for the blockchain from the multiple wireless service providers.

17. A cellular communication device comprising:
one or more processors;
one or more non-transitory computer-readable media;
the one or more non-transitory computer-readable media storing computer-executable instructions that, when executed by the one or more processors, cause the one or more processors to perform actions comprising:
during device provisioning, storing at least an initial portion of a blockchain in the one or more non-transitory computer-readable media, wherein the blockchain specifies permissibility information regarding one or more settings of the cellular communication device;
subsequent to device provisioning, obtaining an updated portion of the blockchain;
receiving a first over-the-air (OTA) configuration command that specifies a requested configuration setting;
verifying, using a processor of the cellular communication device, integrity of at least the updated portion of the blockchain;
determining whether the requested configuration setting specified by the first OTA configuration command is permissible based at least in part on the permissibility information specified by the blockchain; and
in response to verifying the integrity of the at least the updated portion of the blockchain and determining that the requested configuration setting is not permissible, declining to implement the requested configuration setting.

18. The cellular communication device of claim 17, wherein obtaining the updated portion of the blockchain is performed in response to receiving the OTA configuration command.

19. The cellular communication device of claim 17, wherein the permissibility information comprises one or more permissible values for a configuration parameter.

* * * * *